US011455047B1

(12) United States Patent
Mathieu

(10) Patent No.: US 11,455,047 B1
(45) Date of Patent: Sep. 27, 2022

(54) COMPUTER MOUSE WITH INTEGRATED JOYSTICK AND A PLURALITY OF INTERFACE CIRCUITS

(71) Applicant: Clifford Mathieu, Maspeth, NY (US)

(72) Inventor: Clifford Mathieu, Maspeth, NY (US)

( * ) Notice: Subject to any disclaimer, the term of this patent is extended or adjusted under 35 U.S.C. 154(b) by 0 days.

(21) Appl. No.: 17/108,036

(22) Filed: Dec. 1, 2020

Related U.S. Application Data

(63) Continuation-in-part of application No. 16/451,246, filed on Jun. 25, 2019, now abandoned.

(51) Int. Cl.
*G06F 3/038* (2013.01)
*G06F 3/0354* (2013.01)
*G06F 3/0338* (2013.01)
*G06F 3/14* (2006.01)
*G05G 9/047* (2006.01)

(52) U.S. Cl.
CPC .......... *G06F 3/0383* (2013.01); *G06F 3/0338* (2013.01); *G06F 3/03543* (2013.01); *G06F 3/1423* (2013.01); *G05G 9/04785* (2013.01); *G06F 2203/0381* (2013.01)

(58) Field of Classification Search
CPC ............................ G06F 3/0338; G06F 3/03543
See application file for complete search history.

(56) References Cited

U.S. PATENT DOCUMENTS

| | | | |
|---|---|---|---|
| 4,977,397 A | 12/1990 | Kuo | |
| 6,784,870 B2 | 8/2004 | Yin | |
| 2003/0022716 A1* | 1/2003 | Park | A63F 13/211 463/36 |
| 2003/0025673 A1* | 2/2003 | Ledbetter | G06F 3/0312 345/163 |
| 2003/0058219 A1 | 3/2003 | Shaw | |
| 2003/0214484 A1 | 11/2003 | Haywood | |
| 2004/0178990 A1* | 9/2004 | Hsu | G06F 3/03543 345/163 |
| 2005/0206621 A1* | 9/2005 | Dennis | G06F 3/03543 345/166 |
| 2005/0270275 A1* | 12/2005 | Jung | G06F 3/038 345/173 |
| 2006/0077177 A1* | 4/2006 | Kirtley | G06F 3/03543 345/163 |
| 2006/0290671 A1* | 12/2006 | Bohn | G06F 3/0362 345/163 |
| 2007/0195060 A1* | 8/2007 | Moscovitch | G06F 3/0219 345/157 |
| 2008/0106523 A1* | 5/2008 | Conrad | G06F 3/033 345/173 |
| 2011/0193780 A1* | 8/2011 | Schaaf | G06F 1/1601 345/163 |

(Continued)

*Primary Examiner* — Chun-Nan Lin

(57) ABSTRACT

The computer mouse with integrated joy stick is an extension of the prior disclosure. The computer mouse with integrated joy stick is configured for use with a microcontroller. The computer mouse with integrated joy stick forms a communication link with the microcontroller. The computer mouse with integrated joy stick is an interface device commonly known as a mouse. The computer mouse with integrated joy stick sends input in the form of operating instructions to the microcontroller over the communication link to the microcontroller. The microcontroller uses the received operating instructions to control the operation of a plurality of output display devices associated with the microcontroller.

7 Claims, 7 Drawing Sheets

(56) References Cited

U.S. PATENT DOCUMENTS

| | | | |
|---|---|---|---|
| 2012/0105207 A1* | 5/2012 | Trabucco | G06F 3/03543 340/10.1 |
| 2012/0249413 A1* | 10/2012 | Sugahara | G06F 3/0338 345/156 |
| 2012/0256834 A1* | 10/2012 | Glueck | G06F 3/0346 345/158 |
| 2013/0342460 A1* | 12/2013 | Vincent | A63F 13/2145 345/161 |
| 2014/0267038 A1* | 9/2014 | Adler | G05G 9/047 345/161 |
| 2016/0283078 A1* | 9/2016 | Lin | G06F 3/03547 |
| 2017/0108945 A1* | 4/2017 | Chen | G06F 3/03543 |
| 2017/0308165 A1* | 10/2017 | Erivantcev | G06F 3/0346 |
| 2018/0120943 A1* | 5/2018 | Sato | G06F 3/016 |
| 2018/0253156 A1* | 9/2018 | Tseng | G06F 3/0383 |
| 2019/0220107 A1* | 7/2019 | Odgers | G06F 3/0304 |

* cited by examiner

COMPUTER MOUSE WITH INTEGRATED JOYSTICK AND A PLURALITY OF INTERFACE CIRCUITS

CROSS REFERENCES TO RELATED APPLICATIONS

This non-provisional application is a continuation-in-part application filed under 37 CFR 1.53(b) that claims priority under 35 USC 120 to United States non-provisional application U.S. Ser. No. 16/451,246 filed on Jun. 25, 2019 by the inventor: Clifford Mathieu of Wallington, N.J.

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of computing and electric digital data processing, more specifically, a mouse used for as an input device.

SUMMARY OF INVENTION

The computer mouse with integrated joy stick is an extension of the prior disclosure. The computer mouse with integrated joy stick is configured for use with a microcontroller. The computer mouse with integrated joy stick forms a communication link with the microcontroller. The computer mouse with integrated joy stick is an interface device commonly known as a mouse. The computer mouse with integrated joy stick sends input in the form of operating instructions to the microcontroller over the communication link to the microcontroller. The microcontroller uses the received operating instructions to control the operation of a plurality of output devices associated with the microcontroller. In the first potential embodiment of the disclosure, the plurality of output devices comprises a first output display device and a second output display device.

The computer mouse with integrated joy stick comprises a plurality of interface devices, a plurality of interface circuits, and a mouse housing. The mouse housing contains the plurality of interface devices and the plurality of interface circuits. Each of the plurality of interface devices is a switch that allows the user to interface with an interface circuit selected from the plurality of interface circuits. Each of the plurality of interface circuits is an electric circuit that converts the actuation by the client of the interface element into an electric signal that is transmitted to the microcontroller.

These together with additional objects, features and advantages of the computer mouse with integrated joy stick will be readily apparent to those of ordinary skill in the art upon reading the following detailed description of the presently preferred, but nonetheless illustrative, embodiments when taken in conjunction with the accompanying drawings.

In this respect, before explaining the current embodiments of the computer mouse with integrated joy stick in detail, it is to be understood that the computer mouse with integrated joy stick is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the computer mouse with integrated joy stick.

It is therefore important that the claims be regarded as including such equivalent construction insofar as they do not depart from the spirit and scope of the computer mouse with integrated joy stick. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
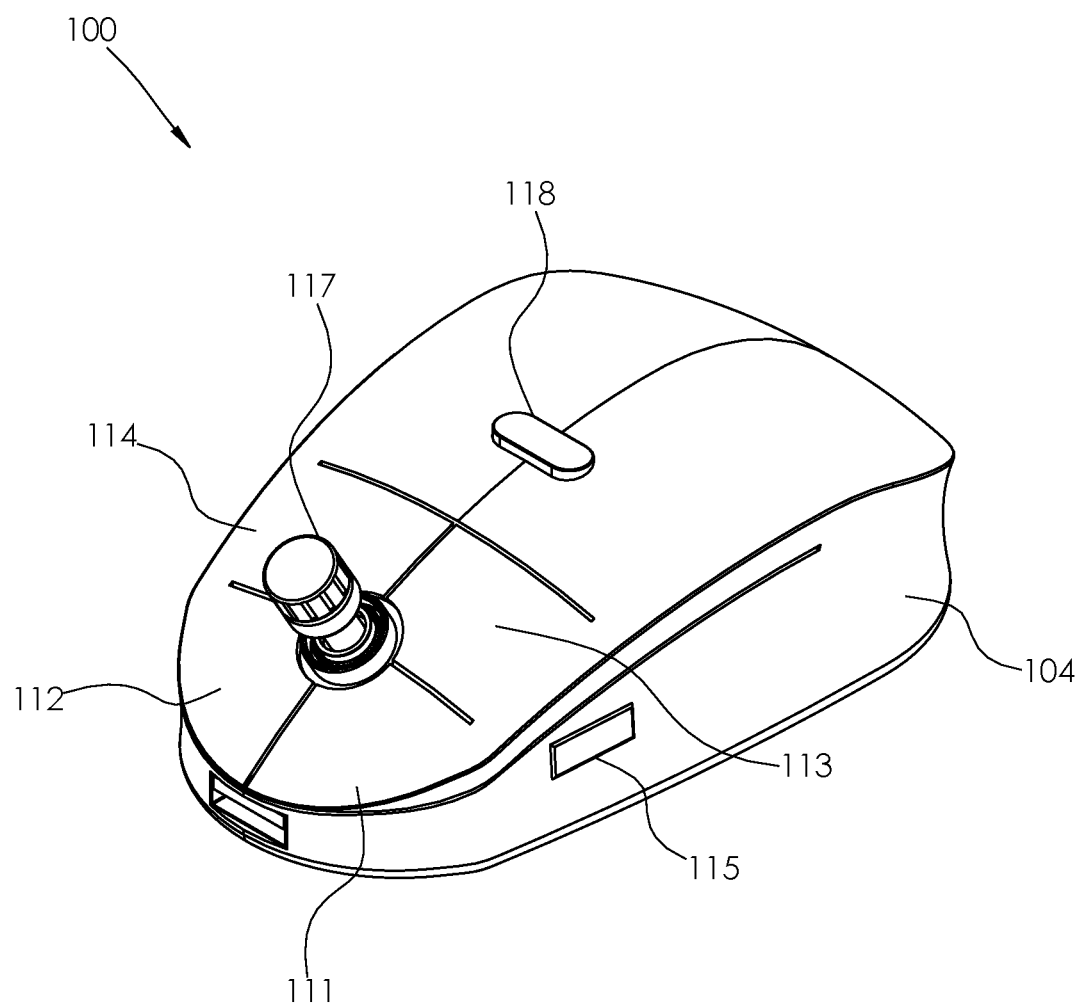
FIG. 1 is a perspective view of an embodiment of the disclosure.
Figure 2:
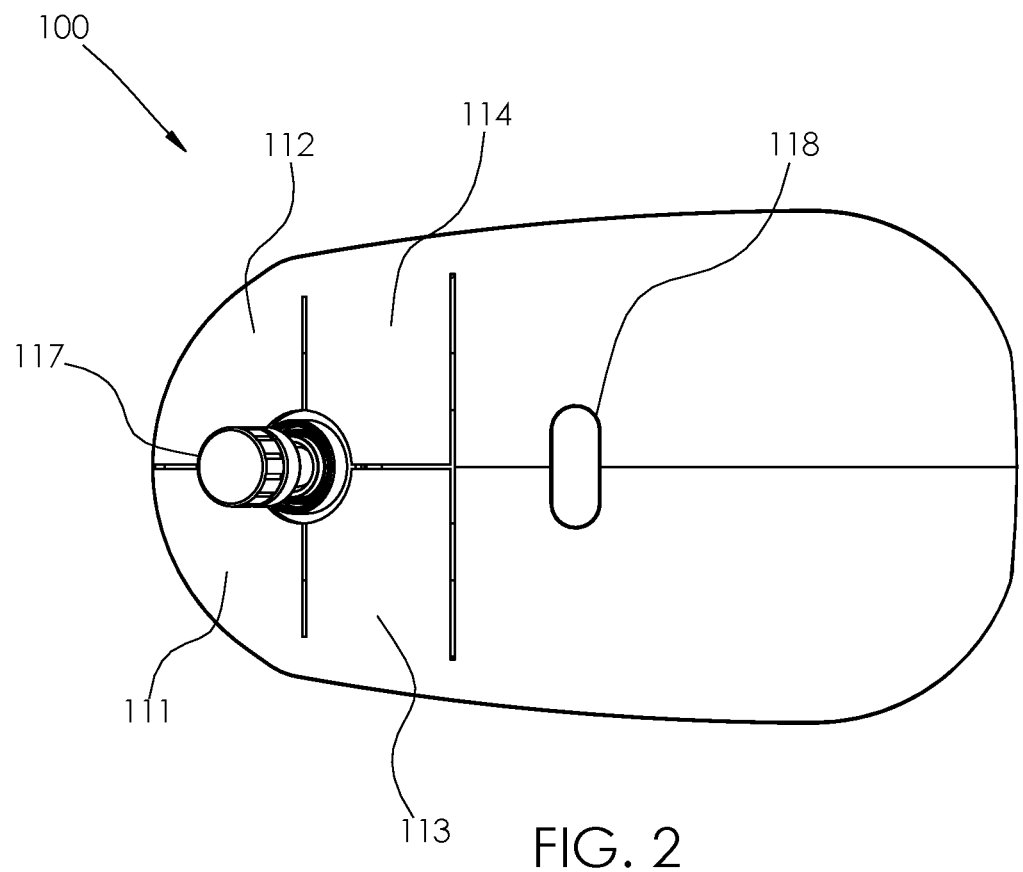
FIG. 2 is a top view of an embodiment of the disclosure.
Figure 3:
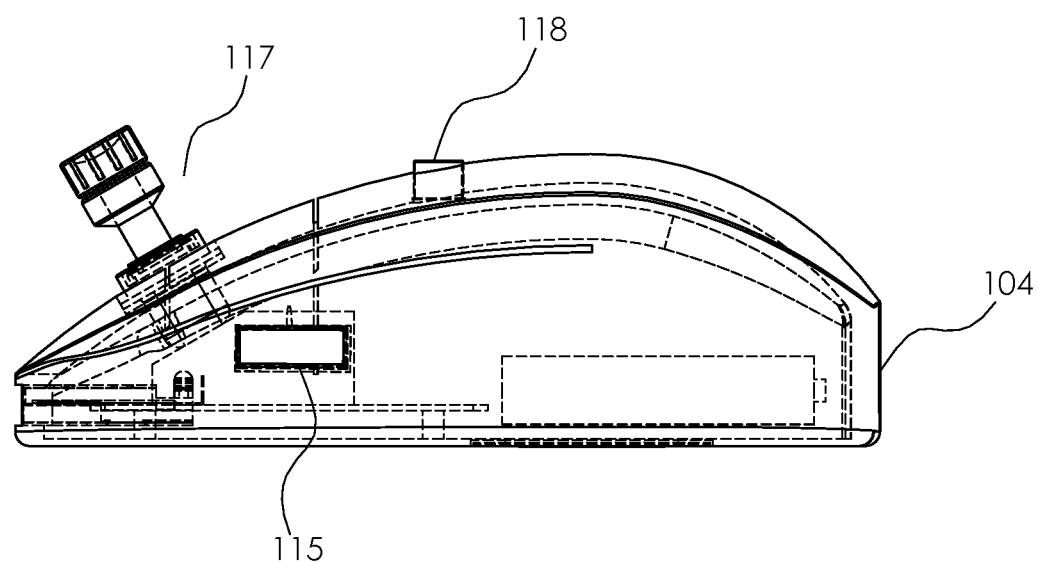
FIG. 3 is a side view of an embodiment of the disclosure.
Figure 4:
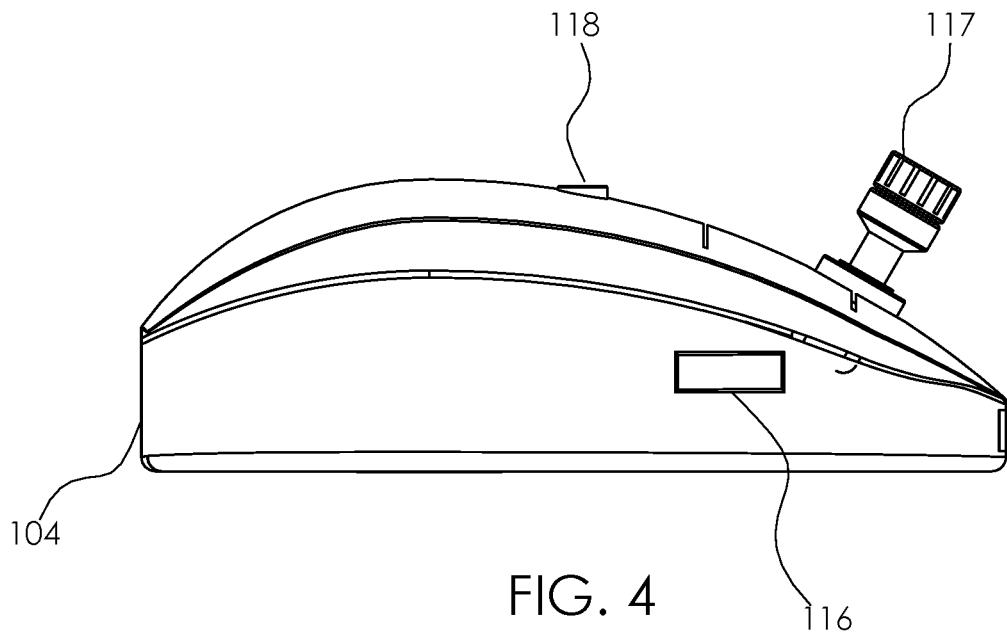
FIG. 4 is a reverse side view of an embodiment of the disclosure.
Figure 5:
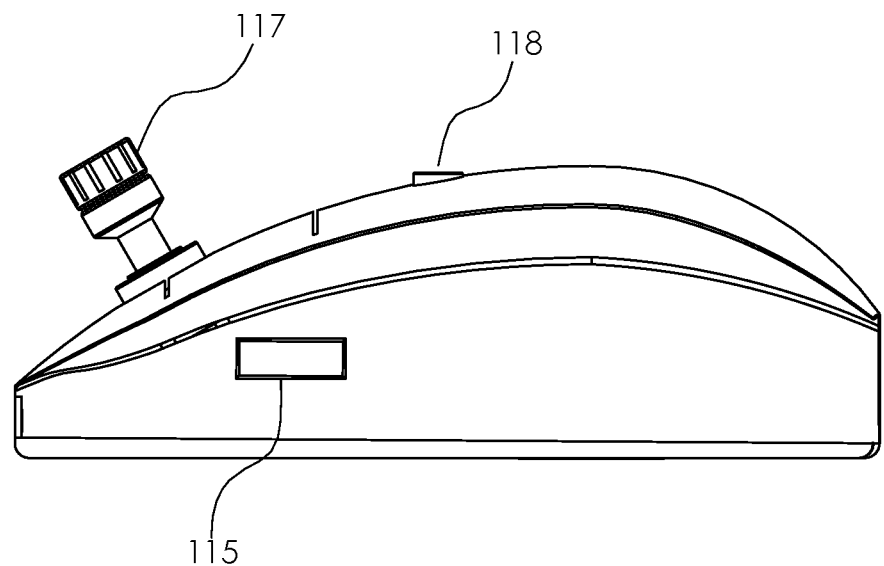
FIG. 5 is a side view of an embodiment of the disclosure.
Figure 6:
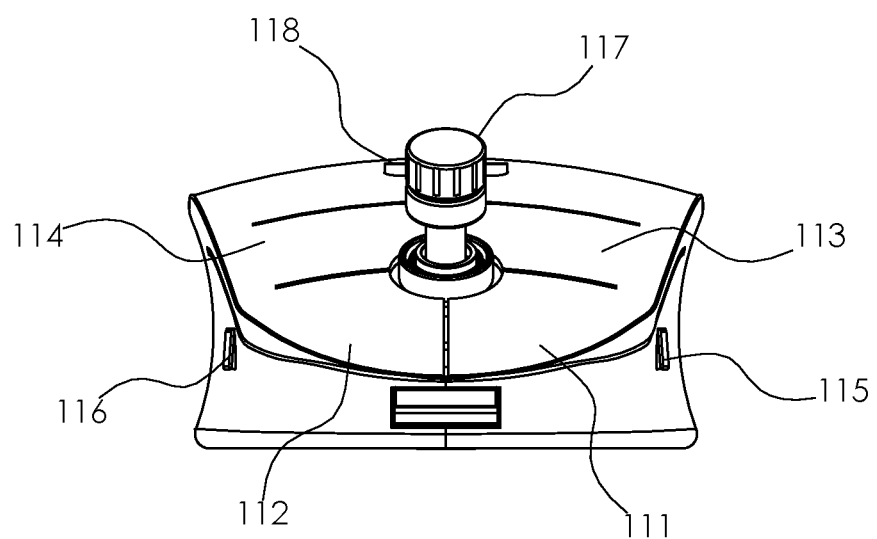
FIG. 6 is a front view of an embodiment of the disclosure.
Figure 7:
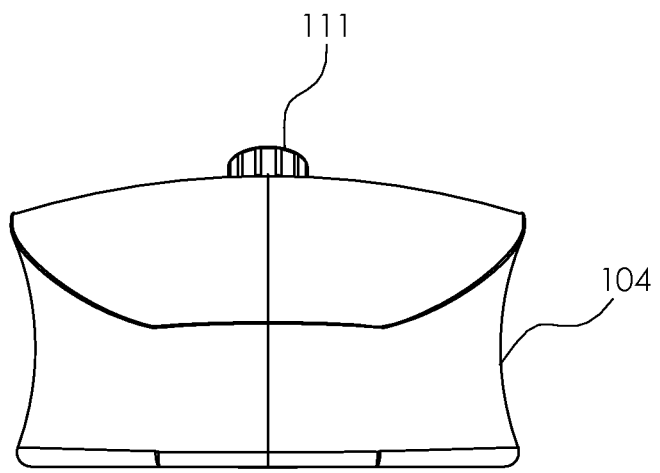
FIG. 7 is a rear view of an embodiment of the disclosure.
Figure 8:
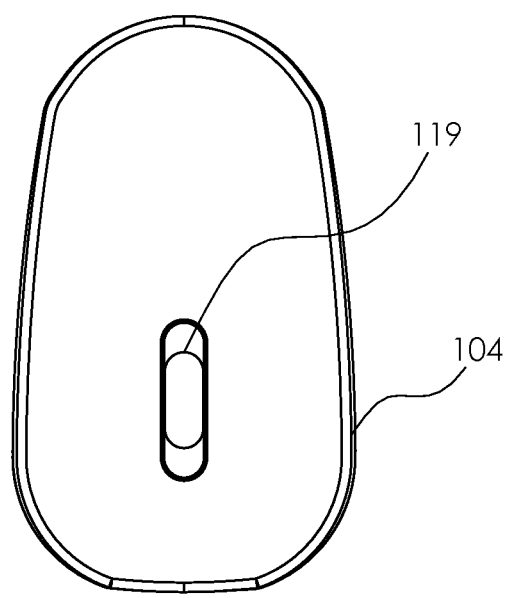
FIG. 8 is a bottom view of an embodiment of the disclosure.
Figure 9:
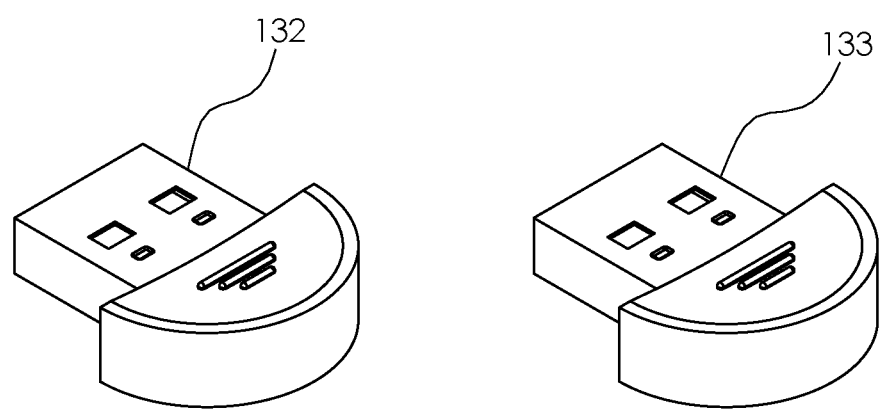
FIG. 9 is a detail view of an embodiment of the disclosure.
Figure 10:
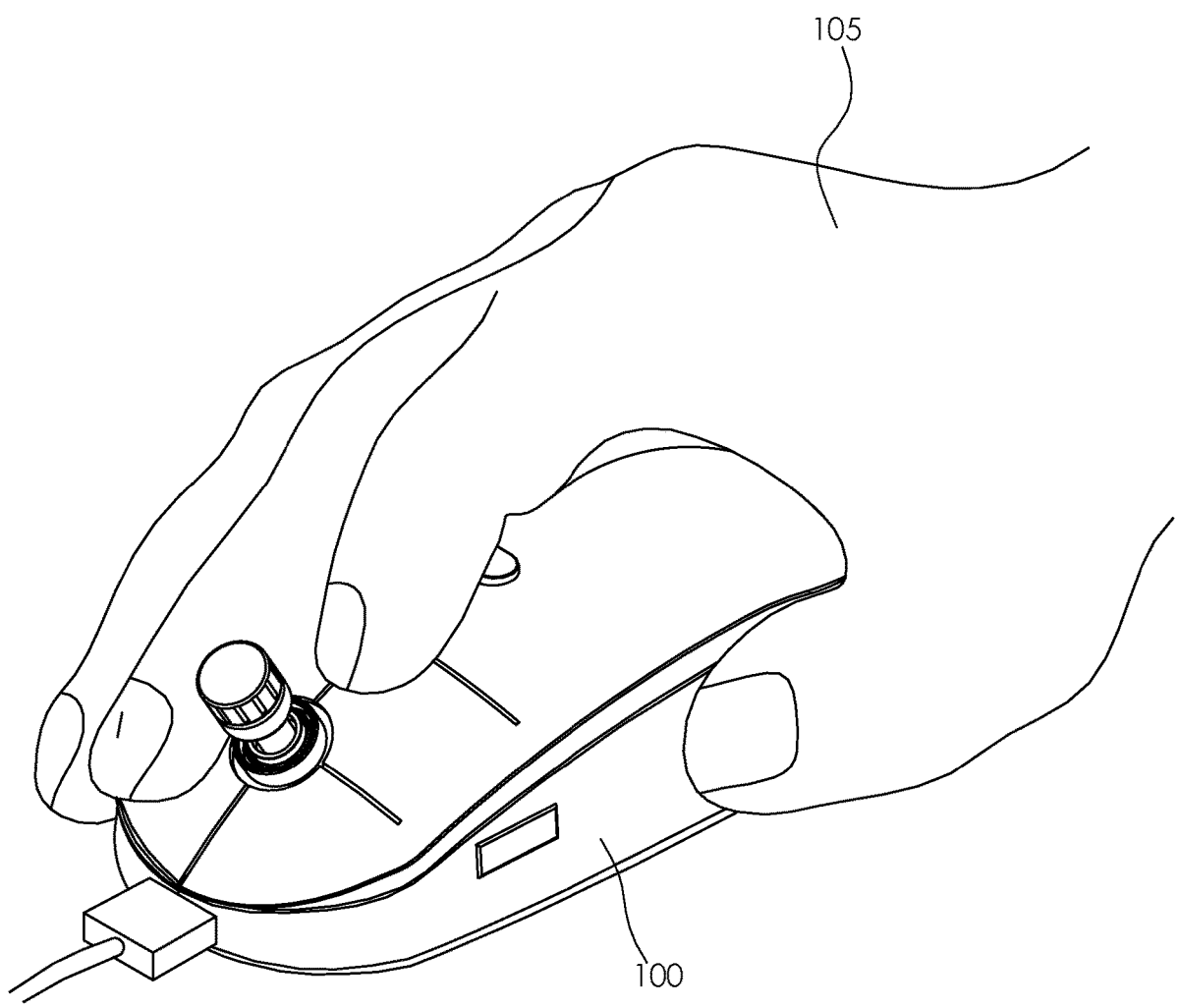
FIG. 10 is an in-use view of an embodiment of the disclosure.
Figure 11:
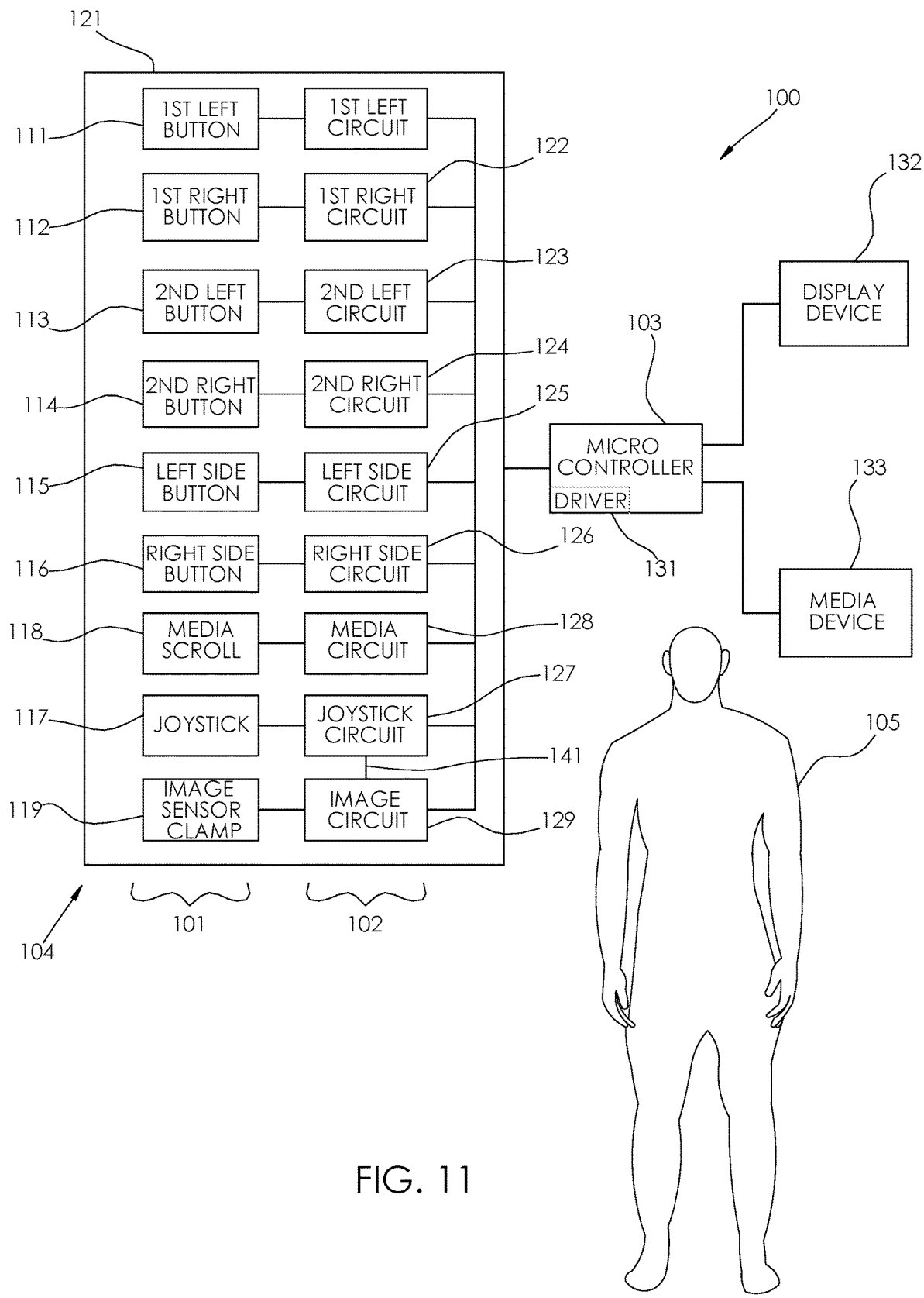
FIG. 11 is a schematic view of an embodiment of the disclosure.

Detailed reference will now be made to one or more potential embodiments of the disclosure, which are illustrated in FIGS. 1 through 11.

The computer mouse with integrated joy stick 100 (hereinafter invention) is an extension of the prior disclosure. The invention 100 is configured for use with a microcontroller 103. The invention 100 forms a communication link with the microcontroller 103. The invention 100 is an interface device commonly known as a mouse. The invention 100 sends input in the form of operating instructions to the microcontroller 103 over the communication link to the microcontroller 103. The microcontroller 103 uses the received operating instructions to control the operation a plurality of output devices associated with the microcontroller 103. In the first potential embodiment of the disclosure, the plurality of output devices comprises a first output display device 132 and a second output display device 133.

The first output display device 132 may be a dongle that connects to a display device, a media device, or combinations thereof. The second output display device 133 may be a dongle that connects with a media device, or combinations thereof. The term display device is being used to loosely refer to a computer screen, tablet computer screen, smart phone screen, or other computer-based display. The term media device is being used to loosely refer to a television screen, an overhead projector screen, or other television-based display. It shall be noted that the first output display device 132 as well as the second output display device 133 may involve any of these different displays described above.

The invention 100 comprises a plurality of interface elements 101, a plurality of interface circuits 102, and a mouse housing 104. The mouse housing 104 contains the plurality of interface elements 101 and the plurality of interface circuits 102. Each of the plurality of interface elements 101 is a switch that allows the user to interface with an interface circuit selected from the plurality of interface circuits 102. Each of the plurality of interface circuits 102 is an electric circuit that converts the actuation by the client 105 of the associated interface element into an electric signal that is transmitted to the microcontroller 103.

The mouse housing 104 is a rigid structure. The mouse housing 104 contains the plurality of interface elements 101 and the plurality of interface circuits 102. The mouse housing 104 is formed with all apertures and form factors necessary to allow the mouse housing 104 to accommodate the use and operation of the plurality of interface elements 101 and the plurality of interface circuits 102. Methods to form a mouse housing 104 suitable for the purposes described in this disclosure are well-known and documented in the mechanical arts.

The microcontroller 103 is a logical device. The microcontroller 103 is defined elsewhere in this disclosure. The microcontroller 103 receives electrical signals from the plurality of interface circuits 102. The microcontroller 103 controls the images displayed on the first output display device 132. The microcontroller 103 controls the operation of the second output display device 133. The microcontroller 103 adjusts the operation of the first output display device 132 in response to operating instructions received from the plurality of interface circuits 102. The microcontroller 103 adjusts the operation of the second output display device 133 in response to operating instructions received from the plurality of interface circuits 102. The microcontroller 103 comprises a driver 131, a first output display device 132, and a second output display device 133.

The driver 131 forms an interface between the plurality of interface circuits 102 and the microcontroller 103. The driver 131 is defined elsewhere in this disclosure. The first output display device 132 is an electric device used by the microcontroller 103 to display images. The first output display device 132 is defined elsewhere in this disclosure. The second output display device 133 is an audio-visual display commonly used for entertainment. The terms second output display device 133 and audio-visual display are defined elsewhere in this disclosure.

Each of the plurality of interface elements 101 is a switching device. Each of the plurality of interface elements 101 mounts on the mouse housing 104. Each of the plurality of interface elements 101 are mounted such that the plurality of interface elements 101 are accessible by the client 105 from the exterior of the mouse housing 104. Each of the plurality of interface elements 101 is incorporated into an interface circuit selected from the plurality of interface circuits 102. There is a one to one correspondence between the plurality of interface elements 101 and the plurality of interface circuits 102. The actuation of each interface element selected from the plurality of interface elements 101 by the client 105 initiates the operation of its associated interface circuit selected from the plurality of interface circuits 102 to generate an electric signal that is transmitted to the microcontroller 103.

The plurality of interface elements 101 comprises a first left button 111, a first right button 112, a second left button 113, a second right button 114, a left side button 115, a right side button 116, a joy stick 117, and a media scroll 118.

The first left button 111 is a switching device. The first left button 111 is an electric switch. The first left button 111 is used by the client 105 to make selections from the first output display device 132. The functionality of the first left button 111 is similar to the functionality of the first left button 111 of the prior disclosure.

The first right button 112 is a switching device. The first right button 112 is an electric switch. The first right button 112 is used by the client 105 to display operating options that are available to the client 105 from the first output display device 132. The functionality of the first right button 112 is similar to the functionality of the first right button 112 of the prior disclosure.

The second left button 113 is a switching device. The second left button 113 is an electric switch. The second left button 113 is used by the client 105 to open up a new tab in a web browser from the first output display device 132. The functionality of the second left button 115 is similar to the functionality of the simultaneous depression of the Ctrl+T or Command+T keys of a keyboard.

The second right button 114 is a switching device. The second right button 114 is an electric switch. The second right button 114 is used by the client 105 to open up a search file/finder menu box to search for files saved on the computer, and which is accessible to the client 105 from the first output display device 132. The functionality of the second right button 114 is similar to the functionality of the simultaneous depression of the Ctrl+0 or Command+0 keys of a keyboard.

The left side button 115 is a switching device. The left side button 115 is an electric switch. The left side button 115 is used by the client 105 to zoom in on images from the output display device 132. The functionality of the left side button 115 is similar to the functionality of the simultaneous depression of the Ctrl & (+ key) or Command & (+ key) of a keyboard.

The right side button 116 is a switching device. The right side button 116 is an electric switch. The right side button 116 is used by the client 105 to zoom out. The functionality of the right side button 116 is similar to the functionality of the simultaneous depression of the Ctrl & (+ key) or Command & (+ key) of a keyboard.

The joy stick 117 is a switching device. The joy stick 117 is an electrical device. The joy stick 117 is used by the client 105 to scroll the overlay window via the first output display device 132 in both the vertical and horizontal directions. The functionality of the joy stick 117 combines the functionality of the vertical scroll wheel and the horizontal scroll wheel.

The media scroll 118 is a switching device. The media scroll 118 is an electrical device. The media scroll 118 is used by the client 105 to call up a hub view from the second output display device 133. The hub view provides a simultaneous display of all media content channels that are available for viewing from the second output display device 133. The media scroll 118 further allows the client 105 to select any of the displayed media content channels for viewing.

The image sensor with lamp 119 is an sensing device that detects changes in the position of the invention 100 relative to the supporting surface on which the invention 100 rests. The image sensor with lamp 119: a) illuminates the supporting surface on which the invention 100 rests; and, b) detects changes in the reflection off the illuminated supporting surface such that the relative change of position of the invention 100 becomes detectable.

Each of the plurality of interface circuits 102 is an electric circuit. Each interface circuit selected from the plurality of interface circuits 102 incorporates an associated interface element selected from the plurality of interface elements 101 into the electric circuit that forms the selected interface circuit. The operation of each interface circuit selected from the plurality of interface circuits 102 is initiated by the actuation of the associated interface element selected from the plurality of interface elements 101. The initiation of the operation of any interface circuit selected from the plurality of interface circuits 102 causes the selected interface circuit to send an electric signal to the driver 131 of the microcontroller 103.

The plurality of interface circuits 102 comprises a first left circuit 121, a first right circuit 122, a second left circuit 123, a second right circuit 124, a left side circuit 125, a right side circuit 126, a joy stick 117 circuit 127, and a media circuit 128.

The first left button 111 is incorporated into the first left circuit 121 such that the actuation of the first left button 111 by the client 105 causes the first left circuit 121 to transmit an electric signal to the driver 131.

The first right button 112 is incorporated into the first right circuit 122 such that the actuation of the first right button 112 by the client 105 causes the first right circuit 122 to transmit an electric signal to the driver 131.

The second left button 113 is incorporated into the second left circuit 123 such that the actuation of the second left button 113 by the client 105 causes the second left circuit 123 to transmit an electric signal to the driver 131.

The second right button 114 is incorporated into the second right circuit 124 such that the actuation of the second right button 114 by the client 105 causes the second right circuit 124 to transmit an electric signal to the driver 131.

The left side button 115 is incorporated into the left side circuit 125 such that the actuation of the left side button 115 by the client 105 causes the left side circuit 125 to transmit an electric signal to the driver 131.

The right side button 116 is incorporated into the right side circuit 126 such that the actuation of the right side button 116 by the client 105 causes the right side circuit 126 to transmit an electric signal to the driver 131.

The joy stick 117 is incorporated into the joy stick 117 circuit 127 such that the actuation of the joy stick 117 by the client 105 causes the joy stick 117 circuit 127 to transmit an electric signal to the driver 131. The actuation of the joy stick 117 circuit 127 by the joy stick 117 causes the joy stick 117 circuit 127 to transmit a supplemental electric signal 141 to the image circuit 129.

The media scroll 118 is incorporated into the media circuit such that the actuation of the media scroll 118 by the client 105 causes the media circuit 128 to transmit an electric signal to the driver 131.

The image sensor with lamp 119 is incorporated into the image circuit 129 such that the motion of the invention 100 by the client 105 causes the image circuit 129 to transmit an electric signal to the driver 131. The supplemental electric circuit 141 generated by the joy stick 117 circuit 127 controls the operation of the image circuit 129. Specifically, the receipt of the supplemental electric signal 141 is used to disable the image circuit 129 while the joystick 117 is in use.

The joystick 117 disables the operation of the image circuit 129 after being pushed down a first time. In this scenario, the joy stick 117 takes control of and is used by the client 105 to control the cursor in lieu of the traditional movement of the computer mouse. When this feature is initiated, the client 105 can move the invention 100 with his or her hand, but the cursor will not move as it is up to movement of the joy stick 117 to move the cursor. It shall be noted that, the client 105 can depress the joy stick 117 a second time in order to turn off this feature, and control of the cursor returns to the traditional movement of the computer mouse.

The following definitions were used in this disclosure:

Audio-Visual Display: As used in this disclosure, an audio-visual display is a display device that further comprises a speaker such that the audio-visual display simultaneously presents visual and audible information in a coordinated manner.

Client: As used in this disclosure, a client is an individual who is designated to receive the services of the disclosure at bar.

Communication Link: As used in this disclosure, a communication link refers to the structured exchange of data between two objects.

Display: As used in this disclosure, a display is a surface upon which is presented an image, potentially including, but not limited to, graphic images and text, that is interpretable by an individual viewing the projected image in a meaningful manner. A display device refers to an electrical device used to present these images.

Driver: As used in this disclosure, a driver is a combination of software and hardware that: a) allows a computer program to deposit a digitally encoded instructions to a location that appears and acts like a memory location; and, b) subsequently physically converts the digitally encoded instructions into electrical signals used to operate an electrical device that performs physical actions; and, c) allows for the communication from the electrical device to the computer program by allowing the electrical device to deposit digitally encoded communication into the location that appears and acts like a memory location.

Joystick: As used in this disclosure, a joystick is a computer interface device. The joystick is configured for use with a computer. The joystick is a rotating lever used to change the position of a cursor on a display device associated with the computer. The joystick sends an electrical signal to the computer that indicates how the position of a cursor should be moved within a displayed image displayed by a display device.

Housing: As used in this disclosure, a housing is a rigid structure that encloses and protects one or more devices.

Media: As used in this disclosure, media refers to the capture, storage, and presentation of audio and visual information.

Media Device: As used in this disclosure, a media device is a device that audibly and visually presents the audio and visual information contained in a media file.

Media File: As used in this disclosure, a media file is a digital representation of the audio and visual information generated by an event.

Media Source: As used in this disclosure, a media source is a device that generates electrical signals that can be converted by a media device into the presentation of the audio and visual information stored in the media file.

Microcontroller: As used in this disclosure, a microcontroller is a small computer comprising a processor core, memory, and programmable input/output peripherals. The microcontroller is a programmable device that accepts digital and analog inputs, processes the digital and analog inputs according to previously stored instruction and provides the results of these instructions as digital or analog outputs.

Mouse: As used in this disclosure, a mouse, also referred to as a computer mouse, is a computer interface device. The mouse is configured for use with a computer. The mouse: a) changes the position of a cursor on a display device associated with the computer; b) indicates to the computer to initiate an action. The initiated action depends on: a) the location of the cursor on the displayed image displayed by the display device; and, b) the specific method used on the mouse to initiate the action. The typical mouse comprises a position sensing device, a left switch (button), a right switch (button), and a scrolling device. The position sensing device detects changes in the physical position of the mouse. The position sensing device sends an electrical signal to the computer that allows the computer move the position of the mouse within the display based on the physical motion of the mouse. The left switch is an electrical switch that sends an electrical signal to the computer that indicates that the computer should take initiate an action. The selected action is a function of the location of the cursor on the displayed image. The right switch is an electrical switch that sends an electrical signal to the computer that indicates that the computer should display a list of optional actions that may be taken. The selected list of optional actions is a function of the location of the cursor on the displayed image. The scrolling device is used in circumstances where the display device forms an overlay. By forming an overlay is meant that the image displayed on the display device is only a portion of the overall image that is available for display. The use of an overlay typically is required by technical limitations or technical preferences set on the computer. The scrolling device is used to adjust the overlay position of the displayed image on the display device. The mouse is often referred to as a pointing device.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction. In a one to one correspondence, the first element of the first set is said to be associated to the second element of the second set to which the first element corresponds.

Overlay: As used in this disclosure, an overlay refers to the placement of a second structure over a first structure such that a portion of the first structure is visible through or around the second structure.

Remote Control: As used in this disclosure, remote control means the establishment of the control of a device remotely generally through the transmission of instructions or coded signals.

Switch: As used in this disclosure, a switch is an electrical device that starts and stops the flow of electricity through an electric circuit by completing or interrupting an electric circuit. The act of completing or breaking the electrical circuit is called actuation. Completing or interrupting an electric circuit with a switch is often referred to as closing or opening a switch respectively. Completing or interrupting an electric circuit is also often referred to as making or breaking the circuit respectively.

Switching Circuit: As used in this disclosure, a switching circuit is non-programmable electrical device that receives one or more digital or analog inputs and uses those digital or analog inputs to generate one or more digital or analog outputs.

With respect to the above description, it is to be realized that the optimum dimensional relationship for the various components of the invention described above and in FIGS. 1 through 11 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A computer interface device comprising
   wherein the computer interface device comprises a plurality of interface elements, a plurality of interface circuits, and a mouse housing;
   wherein the mouse housing contains the plurality of interface elements and the plurality of interface circuits;
   wherein the computer interface device is configured for use with a microcontroller;
   wherein the computer interface device forms a communication link with the microcontroller;
   wherein the computer interface device sends input in the form of operating instructions to the microcontroller;
   wherein the microcontroller uses the received operating instructions to control the operation a plurality of output devices associated with the microcontroller;
   wherein the plurality of interface elements comprises a first left button, a first right button, a second left button, a second right button, a left side button, a right side button, a joy stick, and a media scroll;
   wherein the plurality of interface circuits comprises a first left circuit, a first right circuit, a second left circuit, a second right circuit, a left side circuit, a right side circuit, a joy stick circuit, a media circuit, and an image circuit;
   wherein the first left button is incorporated into the first left circuit;

wherein the first right button is incorporated into the first right circuit;
wherein the second left button is incorporated into the second left circuit;
wherein the second right button is incorporated into the second right circuit;
wherein the left side button is incorporated into the left side circuit;
wherein the right side button is incorporated into the right side circuit;
wherein the joy stick is incorporated into the joy stick circuit;
wherein the media scroll is incorporated into the media circuit;
wherein an image sensor with lamp is incorporated into the image circuit;
wherein each of the plurality of interface elements is a device that forms an interface with an interface circuit selected from the plurality of interface circuits;
wherein each of the plurality of interface circuits is an electric circuit that converts the actuation of the associated interface element into an electric signal that is transmitted to the microcontroller;
wherein the plurality of output devices comprises a first output display device and a second output display device;
wherein the mouse housing is a rigid structure;
wherein the microcontroller is a logical device;
wherein the microcontroller receives electrical signals from the plurality of interface circuits;
wherein the microcontroller controls the images displayed on the first output display device;
wherein the microcontroller controls the operation of the second output display device;
wherein the microcontroller adjusts the operation of the first output display device in response to operating instructions received from the plurality of interface circuits;
wherein the microcontroller adjusts the operation of the second output display device in response to operating instructions received from the plurality of interface circuits;
wherein the microcontroller comprises a driver, a first output display device, and a second output display device;
wherein the driver forms an interface between the plurality of interface circuits and the microcontroller;
wherein the first output display device is an electric device used by the microcontroller to display images;
wherein the second output display device is an audiovisual display;
wherein each of the plurality of interface elements is a switching device;
wherein each of the plurality of interface elements mounts on the mouse housing;
wherein each of the plurality of interface elements are mounted such that the plurality of interface elements are accessible from the exterior of the mouse housing;
wherein each of the plurality of interface elements is incorporated into an interface circuit selected from the plurality of interface circuits;
wherein the actuation of each interface element selected from the plurality of interface elements initiates the operation of its associated interface circuit selected from the plurality of interface circuits to generate an electric signal that is transmitted to the microcontroller;
wherein there is a one to one correspondence between the plurality of interface elements and the plurality of interface circuits;
wherein each of the plurality of interface circuits is an electric circuit;
wherein each interface circuit selected from the plurality of interface circuits incorporates an associated interface element selected from the plurality of interface elements into the electric circuit that forms the selected interface circuit;
wherein the operation of each interface circuit selected from the plurality of interface circuits is initiated by the actuation of the associated interface element selected from the plurality of interface elements;
wherein the initiation of the operation of any interface circuit selected from the plurality of interface circuits causes the selected interface circuit to send an electric signal to the driver of the microcontroller;
wherein the first left button is used to make selections from the first output display device;
wherein the first right button is used to display operating options from the first output display device;
wherein the second left button is used to open up a new tab in a web browser from the first output display device;
wherein the second right button is used to open up a search file/finder menu box to search for files saved on the computer, which are accessible from the first output display device;
wherein the left side button is used to zoom in on the first output display device using a web browser;
wherein the right side button is used to zoom out on the first output display device using a web browser;
wherein the joy stick is used to scroll the first output display device in both the vertical and horizontal directions;
wherein the media scroll is used provides a simultaneous display of all media content channels that are available for viewing on the second output display device;
wherein the media scroll further allows for the selection any of the displayed media content channels;
wherein the first left button is a switching device;
wherein the first left button is an electric switch;
wherein the first left button causes the first left circuit to transmit an electric signal to the driver;
wherein the first right button is a switching device;
wherein the first right button is an electric switch;
wherein the first right button causes the first right circuit to transmit an electric signal to the driver.

2. The computer interface device according to claim 1
wherein the second left button is a switching device;
wherein the second left button is an electric switch;
wherein the second left button causes the second left circuit to transmit an electric signal to the driver.

3. The computer interface device according to claim 2
wherein the second right button is a switching device;
wherein the second right button is an electric switch;
wherein the second right causes the second right circuit to transmit an electric signal to the driver.

4. The computer interface device according to claim 3
wherein the left side button is a switching device;
wherein the left side button is an electric switch;
wherein the left side button causes the left side circuit to transmit an electric signal to the driver.

5. The computer interface device according to claim 4
wherein the right side button is a switching device;
wherein the right side button is an electric switch;

wherein the right side button causes the right side circuit to transmit an electric signal to the driver.

6. The computer interface device according to claim 5 wherein the media scroll is a switching device;
wherein the media scroll is an electrical device;
wherein the media scroll causes the media circuit to transmit an electric signal to the driver.

7. The computer interface device according to claim 5 wherein the joy stick is a switching device;
wherein the joy stick is an electrical device;
wherein the joy stick causes the joy stick circuit to transmit an electric signal to the driver;
wherein the actuation of the joy stick further causes the joy stick circuit to transmit a supplemental electric signal to the image circuit;
wherein the image sensor with lamp is an electrical device;
wherein the image sensor with lamp causes the image circuit to transmit an electric signal to the driver;
wherein the receipt of the supplemental electric signal from the joy stick circuit disables the operation of the image circuit.

* * * * *